(12) United States Patent
Reinders et al.

(10) Patent No.: US 10,833,868 B2
(45) Date of Patent: Nov. 10, 2020

(54) DIRECT ANONYMOUS ATTESTATION-BASED APPARATUS AND METHOD

(71) Applicant: Intel Corporation, Santa Clara, CA (US)

(72) Inventors: Andrew Reinders, Portland, OR (US);
Manoj Sastry, Portland, OR (US);
Santosh Ghosh, Hillsboro, OR (US);
Rafael Misoczki, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 355 days.

(21) Appl. No.: 15/856,179

(22) Filed: Dec. 28, 2017

(65) Prior Publication Data

US 2019/0044732 A1  Feb. 7, 2019

Related U.S. Application Data (60) Provisional application No. 62/595,465, filed on Dec. 6, 2017.

(51) Int. Cl.
| | |
|---|---|
| *H04L 29/06* | (2006.01) |
| *H04L 9/08* | (2006.01) |
| *H04W 12/06* | (2009.01) |
| *H04L 9/32* | (2006.01) |
| *H04L 9/30* | (2006.01) |
| *H04L 9/00* | (2006.01) |

(Continued)

(52) U.S. Cl.
CPC ............ *H04L 9/3247* (2013.01); *H04L 9/003* (2013.01); *H04L 9/0861* (2013.01); *H04L 9/0891* (2013.01); *H04L 9/30* (2013.01); *H04L 9/3073* (2013.01); *H04L 9/3255* (2013.01); *H04L 63/0414* (2013.01); *H04L 63/0823* (2013.01); *H04L 63/0876* (2013.01); *H04L 63/065* (2013.01); *H04L 63/104* (2013.01); *H04L 67/12* (2013.01); *H04L 2209/805* (2013.01); *H04W 4/70* (2018.02); *H04W 12/0609* (2019.01)

(58) Field of Classification Search
CPC ... H04L 9/3247; H04L 9/3255; H04L 9/0891; H04L 9/003; H04L 9/3073; H04L 9/0861; H04L 9/30; H04L 63/0823; H04L 63/0414; H04L 63/0876; H04L 63/104; H04L 63/065
See application file for complete search history.

(56) References Cited

U.S. PATENT DOCUMENTS

| | | | |
|---|---|---|---|
| 2009/0067617 A1* | 3/2009 | Trichina | G06F 7/723 380/28 |
| 2009/0100120 A1* | 4/2009 | Gokay | G06F 7/722 708/491 |

(Continued)

*Primary Examiner* — Daniel B Potratz
*Assistant Examiner* — Vu V Tran
(74) *Attorney, Agent, or Firm* — Trop, Pruner & Hu, P.C.

(57) ABSTRACT

A technique includes generating a direct anonymous attestation (DAA)-based signature to prove an electronic device is a member of a group. Generating the signature includes determining a reciprocal of a prime modulus, and determining the reciprocal of the prime modulus comprises left bit shifting a Barrett multiplier by a predetermined number of bits and multiplying a result of the left bit shifting of the Barrett multiplier with the prime modulus.

18 Claims, 6 Drawing Sheets

(51) Int. Cl.
  *H04W 4/70* (2018.01)
  *H04L 29/08* (2006.01)

(56) References Cited

U.S. PATENT DOCUMENTS

2010/0023572 A1* 1/2010 Dupaquis ................ G06F 7/726
                                                    708/492
2015/0082047 A1* 3/2015 Ozturk ................. H04L 9/3006
                                                    713/189
2016/0134419 A1* 5/2016 Smith .................. H04L 9/0833
                                                    380/30

* cited by examiner

DIRECT ANONYMOUS ATTESTATION-BASED APPARATUS AND METHOD

BACKGROUND

Direct Anonymous Attestation (DAA) provides a way for an electronic device to prove that the device is a member of a group without revealing which member. In DAA, an issuer creates a group public key, and an electronic device obtains a unique membership private key from the issuer. The electronic device may prove that the device is a group member by generating a signature using the device's private key so that the signature may be verified by a verifier using the group public key. DAA contains a revocation mechanism to revoke the membership of the electronic device from the public group. Enhanced Privacy Identification (EPID) is a specific DAA-based scheme, having enhanced revocation capabilities.

DETAILED DESCRIPTION

In accordance with example implementations, techniques and apparatuses are described herein, which allow a resource constrained electronic device to generate Direct Anonymous Attestation (DAA) signatures. In this context, a resource constrained device refers to an electronic device, such as an Internet of Things (IoT) device, which has a limited amount of memory capacity and/or processing capacity for purposes of generating a DAA signature, as compared to other electronic devices, such as tablet computers, notebook computers, desktop computers and so forth. In general an IoT device contains one or multiple sensors (biometric sensors, image sensors, pressure sensors temperature sensors, cameras, and so forth), as well as electronics to communicate data acquired by the sensors with computing system components (a cloud server, for example) that are connected to the Internet and log and/or process the received data. As examples, an IoT device may be used to acquire information pertaining to biomedical devices (heart implants, for example), manufacturing processes, states of automobile components, and so forth.

In accordance with example implementations, the electronic device may be constructed to perform Enhanced Privacy Identification (EPID) attestation, which is a specific type, or category, of DAA. In accordance with further example implementations, the systems and techniques that are described herein may be applied to DAA schemes, other than EPID attestation.

A DAA-based signature, such as an EPID signature, may be used for various purposes, depending on the particular implementation. For example, in accordance with some implementations, an IoT device may generate a signature based on a private key and a group public key for purposes of proving membership of a public group. Proving such membership may be used, for example, for purposes of an IoT device communicating with another computer system (a cloud server, for example) to authenticate an IoT device, provision resources (keys, and so forth), register the IoT device, and so forth.

As an IoT device may serve a specific purpose and not be a general purpose computer, the IoT device may have a limited amount of resources to pertain relatively memory and processing intensive operations. For example, the IoT device may perform various cryptographic operations, such as verify and sign operations in which the electronic device generates a DAA signature, such as an EPID signature. An IoT device may encounter problems performing cryptographic operations involved in generating the EPID signature, as these operations may be resource intensive, if not for the techniques and apparatuses that are described herein. As an example, such potentially resource intensive operations may include processing intensive operations, such as an operation that uses multiplication operations to determine a prime modulus reciprocal (i.e., determining 1/p using Barrett reduction, where "p" represents a prime number), As another example, the potentially resource intensive operation may be a memory intensive operations, such as an operation that uses a relatively large memory space footprint to perform multi-exponentiation (i.e., computing the product of multiple exponential functions, such as "$A^a B^b C^c D^d$").

The electronic device may take on different forms (and thus, may or may not be an IoT device), depending on the particular implementation. In general, the electronic device may be any device that may benefit from the techniques and apparatuses that are described herein to generate DAA signatures. As examples, the electronic device may be an IoT device; a thin client; a server; a client; a desktop computer; a portable or notebook computer; a tablet computer; a smartphone; a wearable device (a watch, for example); and so forth.

For example implementations that are described herein, the electronic device is a processor-based device, i.e., a device in which one or multiple hardware components (one or multiple central processing units (CPUs) or CPU processing cores, for example) execute machine executable instructions (i.e., "software" and/or "firmware") to perform various functions of the electronic device, including functions related to generate DAA signatures, as described herein. It is noted that, in accordance with example implementations, one or more functions of the electronic device may be performed by a hardware circuit that does not execute machine executable instructions, such as, for example, an Application Specific Integrated Circuit (ASIC) and/or a field programmable gate array (FPGA). Moreover, in accordance with example implementations, all or part of the functions of the electronic device for generating DAA signatures, as described herein, may be performed by hardware circuits that do not execute machine executable instructions.

In accordance with example implementations, the electronic device may use a Barrett-based reduction to determine the reciprocal of a prime modulus using a single multiplication operation in the iterative Barrett reduction processing loop (as opposed to two multiplication operations, for example), thereby reducing processing and memory resources. In accordance with example implementations, the electronic device may perform multi-exponentiation using two 3072 bit temporary variables (as opposed to sixteen variables 3072 bit temporary variables, for example), thereby reducing processing and memory resources.

In accordance with example implementations, the ways that are described herein to determine prime modulus reciprocals and perform multi-exponentiation may reduce processing latency by fifty percent, reduce energy consumption by fifty percent and may reduce memory complexity by a factor of eight, as compared to existing multi-exponentiation techniques and systems. Other and different results may be achieved, in accordance with further example implementations. Accordingly, the techniques and systems that are described herein make EPID technology viable for resource constrained electronic devices, such as IoT devices.

Figure 1:
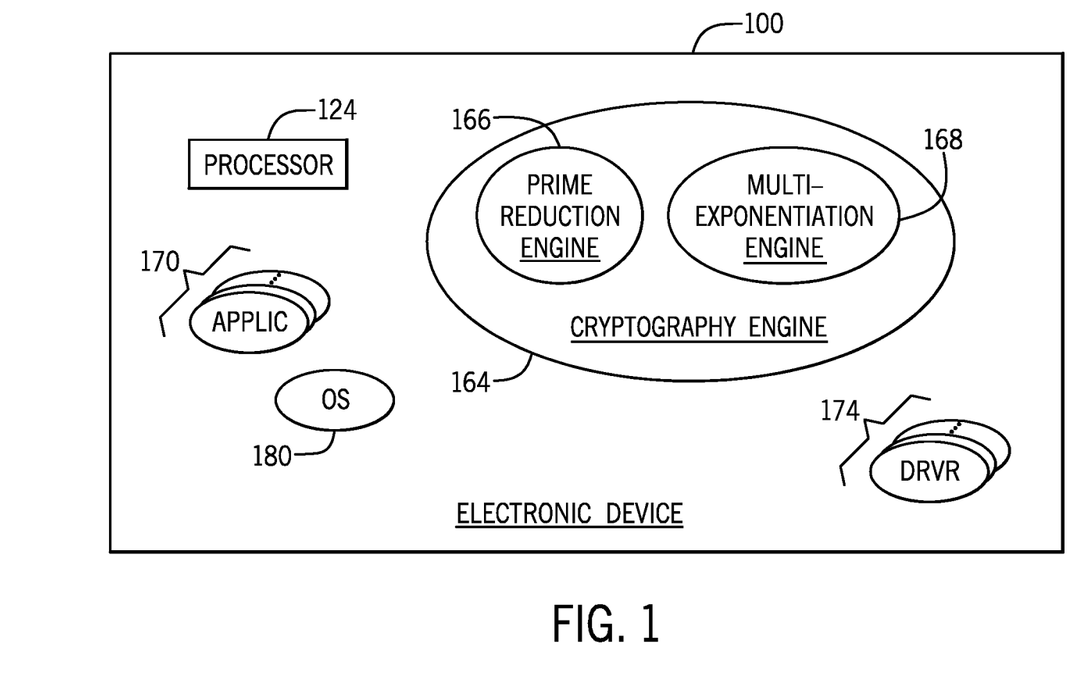
FIG. 1 is a schematic diagram of an electronic device according to an example implementation.

Referring to FIG. 1, as a more specific example, in accordance with some implementations, an electronic device 100 includes various hardware and/or software components, such as a processor 124 (e.g., one or multiple CPUs or CPU processing cores, for example) as well as one or multiple hardware components (described further herein) that provide a cryptography engine 164. As described herein, the cryptography engine 164 has features that minimize the impact on resources of the electronic device 100 for purposes of generating DAA signatures (such as EPID signatures) for the electronic device 100. In particular, as described herein, in accordance with some implementations, the cryptography engine 164 includes a prime reduction engine 166 and a multi-exponentiation engine 168. It is noted that the electronic device 100 may contain various other software and/or hardware components, such as, one or multiple applications 170, an operating system 180, one or multiple device drivers 174, and so forth.

In accordance with some implementations, the cryptography engine 164 may be formed by a general purpose processor, such as the processor 124 or another processor, executing machine executable instructions (or "software"), which are stored on the electronic device 100. In this manner, such instructions may be stored in, for example, a non-transitory storage medium (a storage medium stored from semiconductor memory devices, volatile memory devices, non-volatile memory devices, memristors, phase change memory devices, magnetic storage, a combination of one or more of the foregoing storage technologies, and so forth). In accordance with further example implementations, the cryptography engine 164 may be formed from a hardware component, such as an ASIC or FPGA, which does not execute machine executable instructions. In accordance with further example implementations, the cryptography engine 164 may include one or multiple special purpose processors that are dedicated to performing cryptographic-related operations for the electronic device 100 such as, for example, operations pertaining to encrypting data, decrypting data, generating DAA-based signatures, generating EPID-based signatures, and so forth. Moreover, in accordance with further example implementations, the cryptography engine 164 may be formed from a combination of one or multiple hardware components that do execute machine executable instructions and one or multiple hardware processors that execute machine executable instructions.

In accordance with example implementations, the cryptography engine 164 generates a DAA-based signature (also called a "DAA signature" herein), such as an EPID-based signature (also called an "EPID signature" herein) in a process that involves determining the reciprocals of prime moduli, or prime numbers (i.e., determining the reciprocals of prime numbers). One way to perform EPID prime reduction involves the use of multiple Barrett reduction iterations, which may be described as follows for purposes of computing the reciprocal of the most significant 32 bits of a prime number:

I. Multiply Barrett multiplier (32-bit reciprocal) with most significant (k+32) bits of the intermediate reduced result;

II. Multiply most significant 32 bits of the result of Step I with prime modulus;

III. Subtract the result of the Step II from most significant k+32 bits of the intermediate reduced result;

IV. Left bit shift the intermediate result by 32 bits to form the new intermediate reduced result; and V. Repeat Steps I to IV until the result is reduced to a k bit number.

Figure 2:
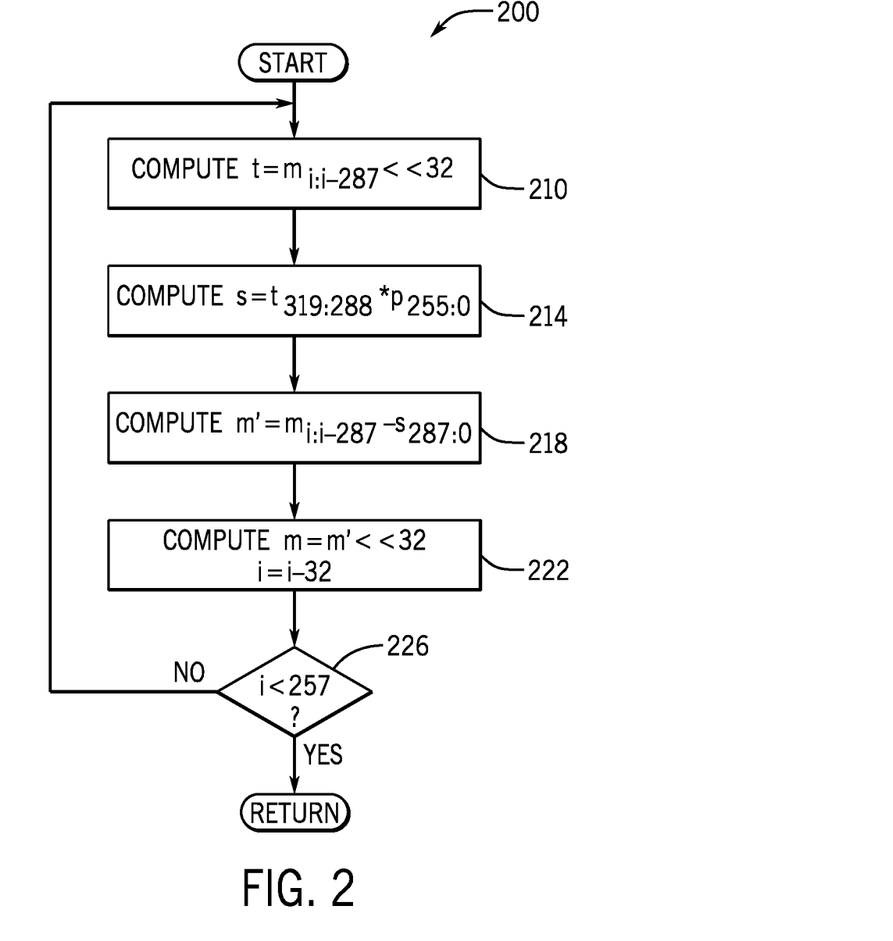
FIG. 2 is a flow diagram depicting a resource efficient Barrett reduction technique to determine the reciprocal of a prime modulus according to an example implementation.

Referring to FIG. 2 in conjunction with FIG. 1, in accordance with example implementations, the prime reduction engine 166 may perform EPID prime reduction according to a technique 200, which is less processing intensive than the above-described EPID prime reduction. In general, the technique 200 follows the above-described EPID prime reduction. In other words, blocks 214, 218, 222 and 226 of the technique 200 follow Steps II to V, respectively, of the EPID prime reduction outlined above. However, unlike the above-described EPID prime reduction, in accordance with example implementations, the technique 200 performs EPID prime reduction in a manner that conserves processing resources. In this manner, the technique 200 performs the operation depicted in block 210 (instead of Step II) to eliminate a processing intensive multiplication operation that is involved in the prime redactor.

In this manner, in accordance with example implementations, generating a given EPID signature involves applying Barrett reduction twice to determine the reciprocal of two prime numbers, p and q. The value of the most significant 32-bits of EPID primes (both p and q) are exactly $2^{32}-1$. Thus, the Barrett multiplier (i.e., the reciprocal) is $2^{32}$. Therefore, instead of the multiplication operation set forth above in Step II, block 210 involves left bit shifting the intermediate reduced result. In other words, the output of block 210 of the technique is the 32-bit, left shifted multiplicand, and the most significant 32-bit of this output is used in block 218. The technique 200 therefore reduces the number of multiplications from two to one in each iteration of the EPID prime reduction, which leads to 50% better latency and energy efficiency, in accordance with example implementations.

Figure 3:
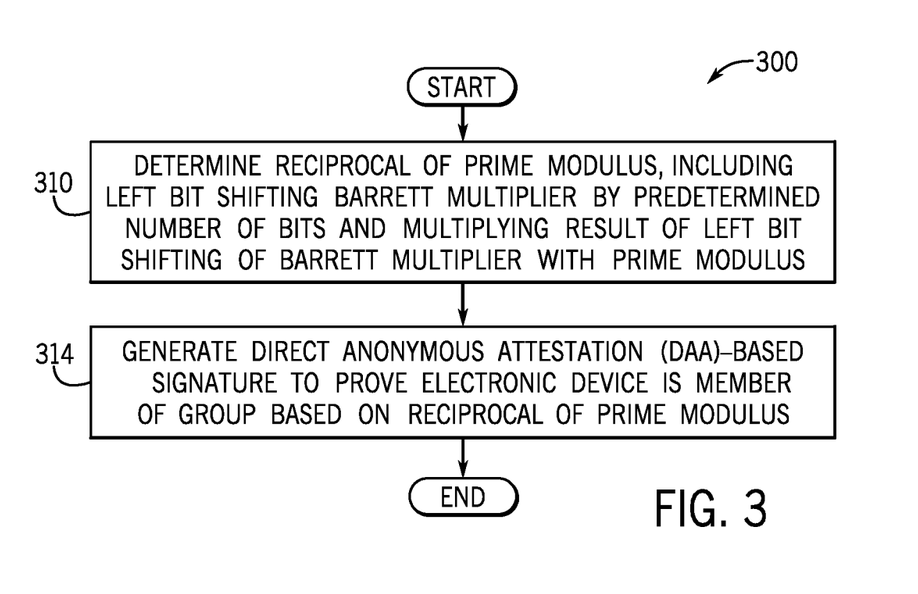
FIGS. 3 and 4 are flow diagrams depicting techniques to generate Direct Anonymous Attestation (DAA) signatures in resource constrained electronic devices according to example implementations.

Thus, referring to FIG. 3 in conjunction with FIG. 1, in accordance with example implementations, an electronic device, such as the electronic device 100 that includes the prime reduction engine 166, may perform a technique 300 that includes performing multiple iterations of a Barrett reduction to determine the reciprocal of a prime modulus. A given iteration of the multiple iterations includes left bit shifting (block 310) a Barrett multiplier by a predetermined number of bits and multiplying a result of the left bit shifting of the Barrett multiplier with the prime modulus. The technique 300 includes generating (block 314) a DAA-based signature based on a private key and a public key to prove membership of the electronic device in a public group based on the determined reciprocal of the prime modulus.

Referring to FIG. 1, in accordance with some implementations, the multi-exponentiation engine 168 performs multiplication of multiple exponential functions (called performing "multi-exponentiation" herein) using a technique that conserves the allocation of memory for temporary variables involved in this process.

As a more specific example, the generation of the EPID signature by the electronic device 100 may involve computing, or determining, "$A^a B^b C^c D^d$." More specifically, in accordance with some implementations, "A," "B," "C," and "D" represent respective 3072 bit numbers; and "a," "b," "c," and "d" represent respective 256 bit numbers. One way to perform this operation may be described as follows:

```
Let f = 1 (in Fq¹²)
For i = 0, ... 15, let wxyz = i be the binary representation of i
    Compute table[i] such that table[i] = A^w B^x C^y D^z. This can be done by
    letting
        table[0] = 1
        table[1] = table[0] · D
        table[2, 3] = table[0, 1] · C
        table[4 ... 7] = table[0 ... 3] · B
        table[8 ... 15] = table[0 ... 7] · A
For i = 255 to 0,
    Let w = a_i, x = b_i, y = c_i, z = d_i, and let wxyz denote 8·w + 4·x +
    2·y + z
    Let f = f · f
    Let f = f · table[wxyz], with side-channel-resistant table-lookup
    techniques
Return f
```

EXAMPLE 1

In Example 1, the first part of the multi-exponentiation technique is a precomputation stage, in which a sixteen entry auxiliary table (table[ ]) is created, based on A, B, C and D. The second part of Example 1 is an evaluation stage in which the multiplication operations are performed. As can be seen, the evaluation stage involves 256 iterations, where each iteration involves multiplications involving the auxiliary table. As the auxiliary table has sixteen entries, each iteration of the computation stage involves storing sixteen temporary variables, i.e., each entry of the auxiliary table. Moreover, each of these temporary variables store 3072 bits of data. In accordance with example implementations, for purposes of determining $A^a B^b C^c D^d$ for a resource-constrained electronic device, the following technique may be used by the multi-exponentiation engine 168 to determine the $A^a B^b C^c D^d$ multi-exponentiation product:

```
Let f = 1, g = 1 (in Fq¹²)
Let AB = A * B, CD = C * D
for i in 255, ..., 0
    f = f · f
    if a_i = 1, store A in g
    if b_i = 1, store B in g
    if a_i = b_i = 1, store AB in g
    g = f · g
    if a_i or b_i is 1, store g in f
    if c_i = 1, store C in g
    if d_i = 1, store D in g
    if c_i = d_i = 1, store CD in g
    g = f · g
    if c_i or d_i is 1, store g in f
```

EXAMPLE 2

The multi-exponentiation of Example 2 uses two 3072 bit temporary variables, i.e., g and f, as compared to the sixteen temporary variables in Example 1. In this manner, Example 2 involves a precomputation stage involving two computations: AB=A*B, and CD=C*D. The computation stage of Example 2 involves manipulations of just these two temporary variables. In this regard, the two temporary variables f and g are reused in each of the 256 iterations, with the temporary variable f providing the final result (as a result of the final iteration) and the input for the next iteration (for iterations other than the final iteration).

Figure 4:
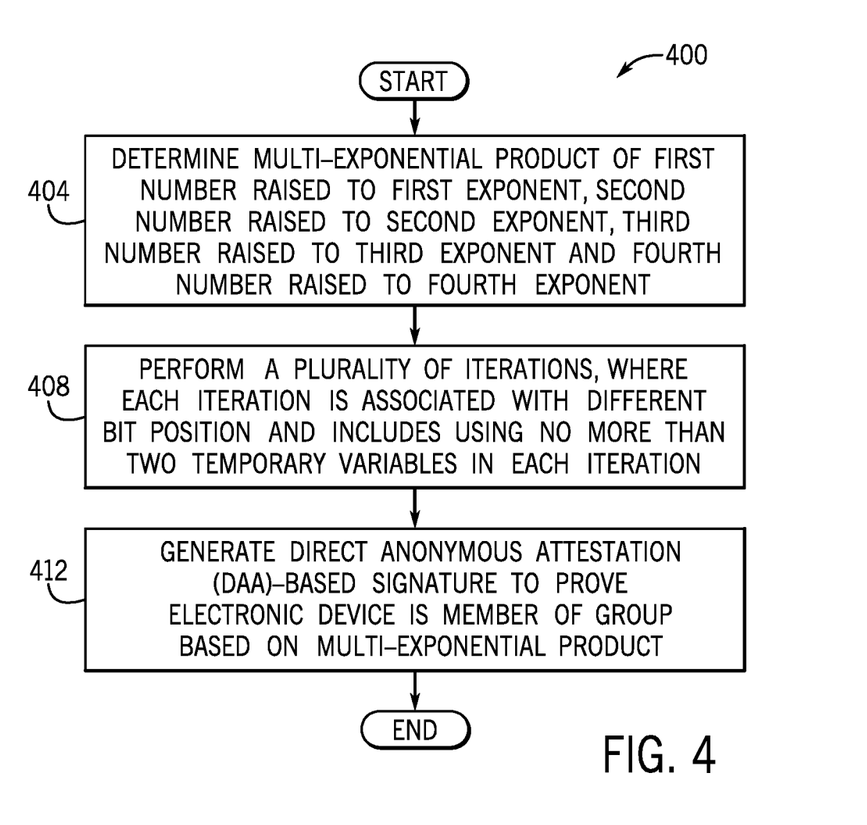

Thus, referring to FIG. 4 in conjunction with FIG. 1, in accordance with example implementations, an electronic device, such as the electronic device 100 that includes the multi-exponentiation engine 168, may perform a technique 400 for purpose of performing multi-exponentiation. The technique 400 includes determining (block 404) a multi-exponential product of a first number raised to a first exponent, a second number raised to a second exponent, a third number raised to a third exponent and a fourth number raised to a fourth exponent. Pursuant to block 408, a plurality of iterations are performed, where each iteration is associated with a different bit position and includes using no more than two temporary variables in each iteration. Pursuant to block 412, a DAA-based signature may be generated to prove that the electronic device is a member of the group based on the determined multi-exponential product.

Figure 5:
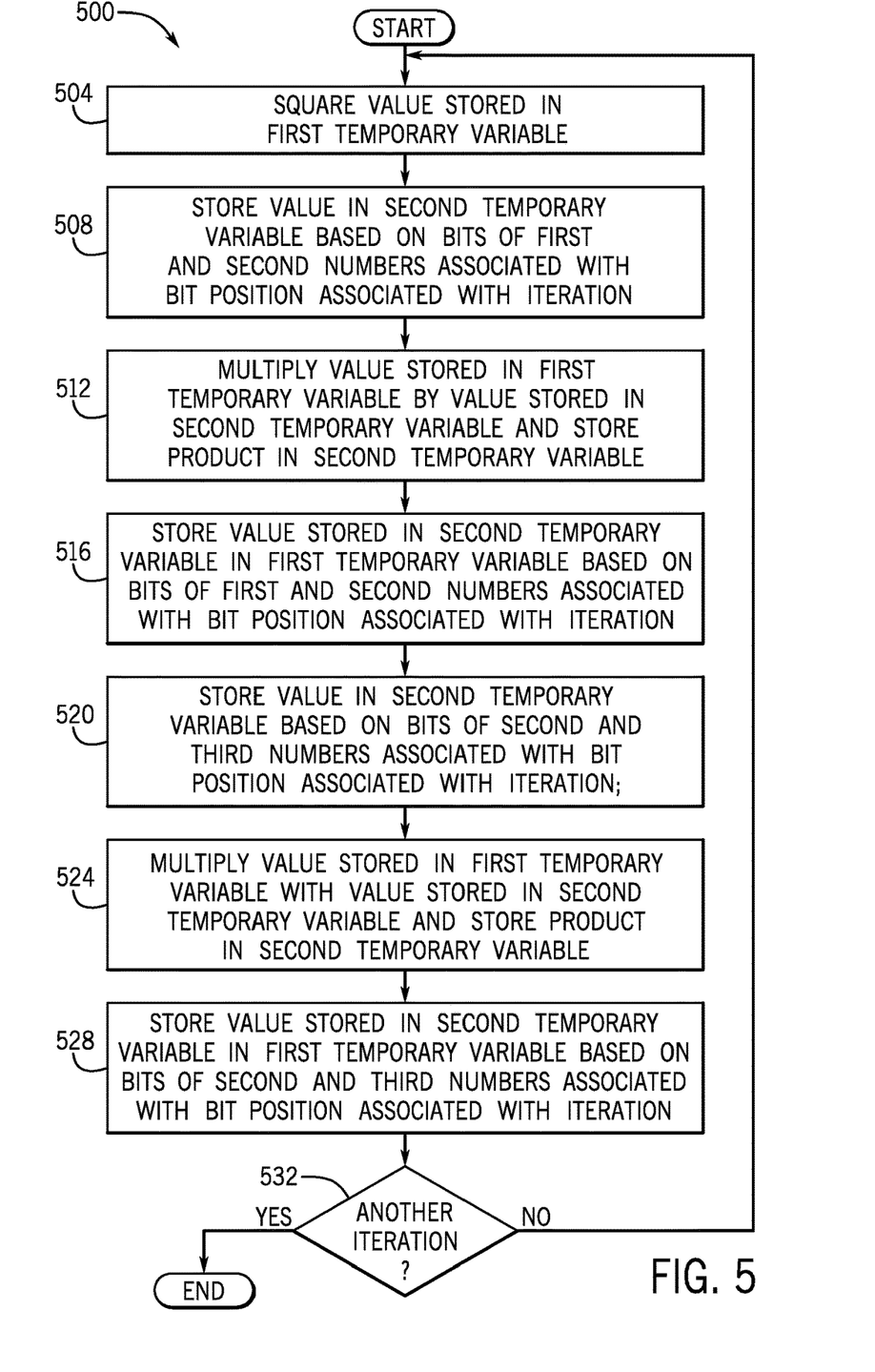
FIG. 5 is a flow diagram depicting a resource efficient multi-exponentiation technique according to an example implementation.

More specifically, referring to FIG. 5 in conjunction with FIG. 1, in accordance with example implementations, the multi-exponentiation engine 168 may perform multi-exponentiation as depicted in a technique 500. The technique 500 includes squaring (block 504) a value stored in a first temporary value and storing (block 508) a value in a second temporary variable based on bits of the first second numbers associated with the position associated with the iteration. The technique 500 includes multiplying (block 512) a value that is stored in the first temporary variable by the value that is stored in the second temporary variable and storing the product in the second temporary variable. The technique 500 includes storing (block 516) the value stored in the second temporary variable in the first temporary variable based on bits of the first and second numbers associated with the bit position associated with the iteration. Pursuant to block 520, the technique 500 includes storing a value in the second temporary variable based on the bits of the second and third numbers associated with the bit position associated with the iteration. The technique 500 includes multiplying (block 524) the value that is stored in the first temporary variable with the value that is stored in the second temporary variable and storing the product in the second temporary variable; and storing (block 528) the value stored in the second temporary variable in the first temporary variable based on bits of the second and third numbers associated with the bit position associated with the iteration. If another iteration is to be performed (decision block 532) then control returns to block 504. Otherwise, the first temporary variable stores data representing the multi-exponential product.

Figure 6:
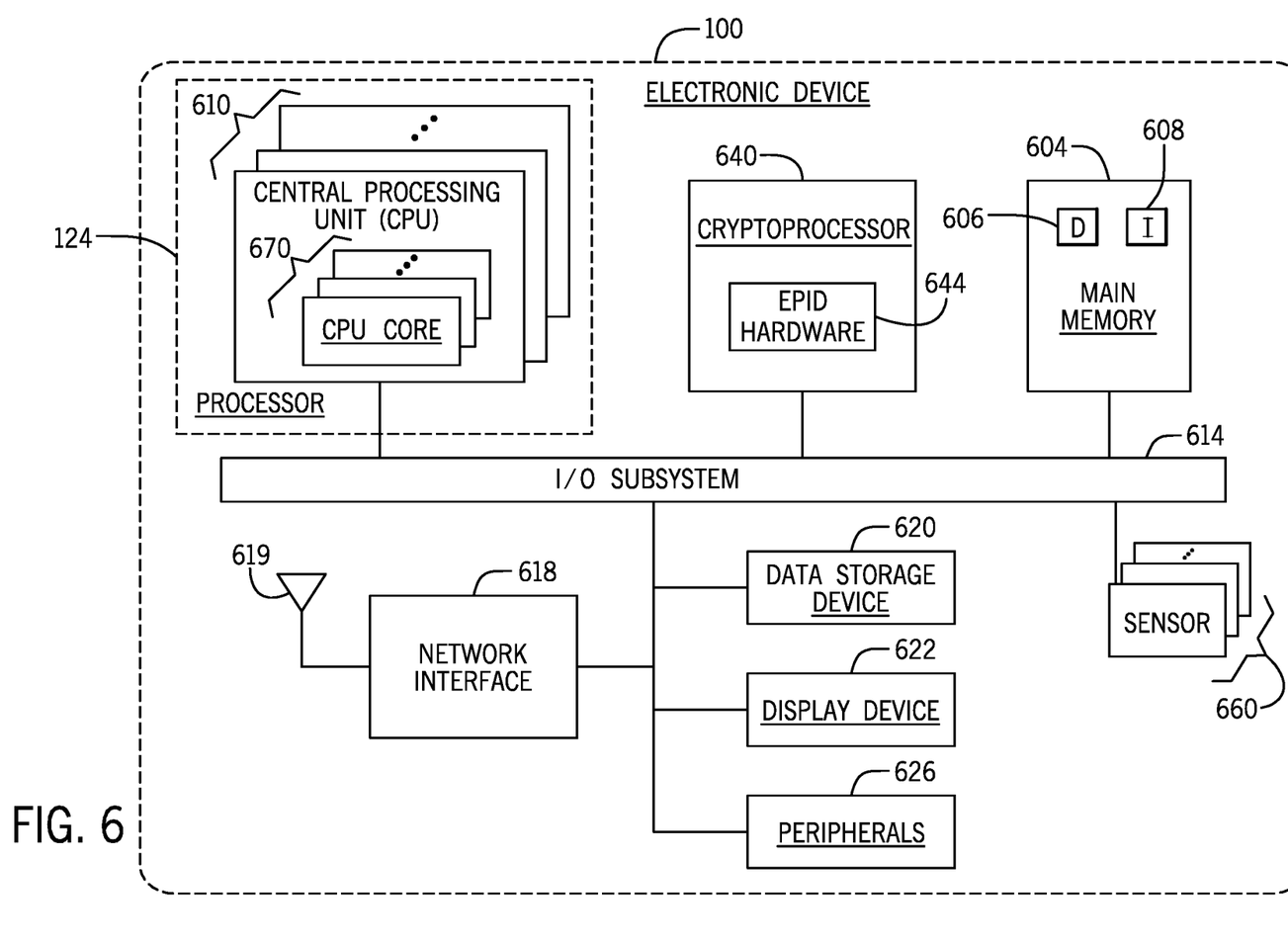
FIG. 6 is a schematic diagram of an electronic device according to an example implementation.

In accordance with example implementations, the electronic device 100 may have an architecture that is depicted in FIG. 6. Referring to FIG. 6, in accordance, the processor 124 may include one or multiple central processing units (CPUs) 610, a main memory 604, an input/output (I/O) subsystem 614, and one or multiple network interfaces 618. In accordance with example implementations, the electronic device 100 may include one or multiple additional components, such as a data storage device 620, a display device 622 (a touch screen display to provide a visual output for the electronic device and provide touch-based input for the electronic device 100, for example), one or multiple peripherals 626, and so forth. In accordance with example implementations, one or more of the components depicted in FIG.

6 may be incorporated in, or otherwise form a portion of, another component. For example, in accordance with some implementations, the main memory 604, or portions thereof, may be incorporated into a CPU 610.

The CPU 610 may be embodied as any type of processor capable of performing the functions that are described herein. The CPU 610, depending on the particular implementation, may be a single core processor, a multi-core processor, a microcontroller, or other processor or processing/controlling circuit. For the example implementation of FIG. 6, the CPU 610 may contain one or multiple CPU cores 670. In accordance with example implementations, one or multiple CPU cores 670 may be part of a single integrated circuit package.

Depending on the particular implementation, the main memory 604 may be a non-transitory memory that may be formed from, as examples, semiconductor storage devices, memristors, magnetic storage devices, phase change memory devices, a 3D cross-point non-volatile memory, and so forth, depending on the particular implementation.

In accordance with example implementations, the main memory 604 may store data 606 and machine executable instructions 608 for purposes of implementing one or more of the techniques that are described herein, such as, for example, performing the prime number reduction and/or multi-exponentiation, as described herein.

As depicted in FIG. 6, in accordance with example implementations, the electronic device 100 may include a cryptographic processor, or cryptoprocessor 640, which may include, for example, one or multiple CPUs or CPU cores for purposes of performing cryptographic functions for the electronic device 100, such as, for example, functions involve determining an EPID signature and performing the prime number reduction and multi-exponentiation, as described herein. In accordance with further example implementations, the cryptoprocessor 640 may include one or multiple hardware units that perform parts of the techniques that are described herein, as well as perform techniques in their entireties, without executing machine executable instructions. In this regard, in accordance with these example implementations, the hardware units may be, for example, FPGAs, ASICs. Regardless of its particular form, in accordance with some implementations, the cryptoprocessor 640 may perform EPID-based functions include EPID hardware 644, which is described below. In accordance with some implementations, the processor 610 and the cryptoprocessor 640 may be part of the same semiconductor package.

The I/O subsystem 614 may, in general, facilitate input/output operations with the CPU 610, the main memory 604, the cryptoprocessor 640, and other components of the electronic device 100. As examples, the I/O subsystem 614 may include memory controller hubs, input/output control hubs, integrated sensor hubs, firmware devices, communication links (i.e., point-to-point links, bus links, wires, cables, light guides, printed circuit board traces, etc.), and/or other components and subsystems to facilitate the input/output operations. In accordance with example implementations, the I/O subsystem 614 may form a portion of a system-on-a-chip (SoC) and be incorporated, along with one or more of the CPU 610, the main memory 604, and other components of the electronic device 100, on a single integrated circuit chip.

As depicted in FIG. 6, in accordance with some implementations, the electronic device 100 may include one or multiple sensors 660. In this manner, for example implementations in which the electronic device is an IoT device, the sensor 660 may include, for example, pressure sensors, temperature sensors, sensors to sense various aspects of manufacturing operations, biometric sensors, image sensors, cameras, and so forth. As depicted in FIG. 6, the sensor 660 may be coupled to the I/O subsystem 614.

As also depicted in FIG. 6, in accordance with some implementations, the network interface 618 may be contained on one or more add-in-boards, daughter cards, network interface cards, controller chips, chipsets, or other devices that may be used by the electronic device 100. In accordance with example implementations, the network interface 618 may be a system-on-a-chip (SoC) that includes one or more processors, or included on a multichip package that also contains one or more processors. In accordance with example implementations, the network interface 618 may include one or multiple local processors (not shown) and/or a local memory (not shown), which are local to the network interface 618. In accordance with example implementations, the local processor of the network interface 618 may be capable of performing one or more functions of the electronic device 100, as described herein. In general, the network interface 618 may communicate various data, including data representing private keys, public keys, objects signed by EPID signatures, and so forth.

In accordance with example implementations, the network interface 618 may communicate over a wide variety of network fabric. As depicted in FIG. 6, in accordance with some implementations, the network interface 618 may communicate with a wireless access point or radio tower via over one or multiple antennae 619. In general, the network fabric with which the network interface 618 communicates may include any type of wired or wireless communication network, including cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), telephony networks, local area networks (LANs) or wide area networks (WANs), global networks (e.g., the Internet), or any combination thereof. Moreover, in accordance with example implementations, the network fabric may include any number of network devices for purposes of facilitating communication between the electronic device 100 and another network component.

Figure 7:
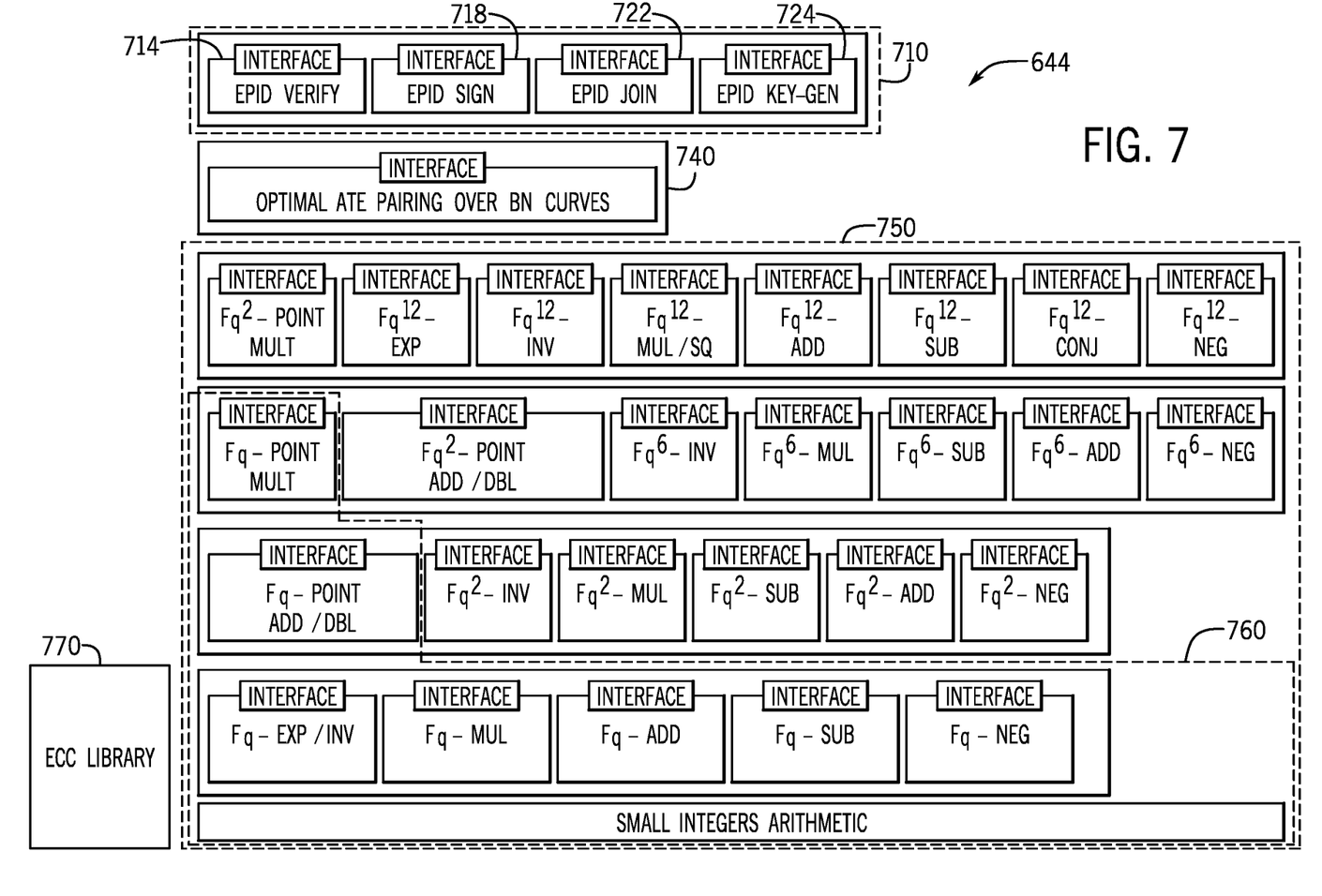
FIG. 7 is a schematic diagram of Enhanced Privacy Identification (EPID) hardware of the electronic device of FIG. 6 according to an example implementation.

Referring to FIG. 7, in accordance with example implementations, the EPID hardware 644 may include components 710 for purposes of performing EPID join, sign and verify operations as well as an interface 740 for purposes of performing Ate pairing over Barreto-Naehrig (BN) curves. As also depicted in FIG. 7, in accordance with some implementations, the EPID hardware 644 may include an error correction code (ECC) library 770 and components 750 for purposes of performing extension field arithmetic for the cryptoprocessor 640. The components 750 may include component 760, which may be performed by underlying elliptic curve hardware components of the cryptoprocessor 640, in accordance with example implementations.

In accordance with example implementations, for the extension field arithmetic components 750 that are depicted in FIG. 7, "Fq" represents the Galois Field of order q; "$Fq^2$" represents a degree two finite field extension of Fq, of order $q^2$; "$Fq^6$" represents a degree three extension of $Fq^2$, of order $q^6$; and q represents a degree-two extension of $Fq^6$, of order $q^{12}$. In general, an Fq*-add component computes the sum of two values in its respective finite field; an Fq*-sub ccomponent computes the difference of the two values in its respective finite field; an Fq*-mul component computes the product of two values in the finite field; an Fq*-inv component computes the finite field inverse of the input value; and Fq*-neg computes the negation of the input value in the finite field. A conjugate $Fq^{2x}$ conj component (x>0) represents is a binomial formed by negating the second term of a binomial. The conjugate of x+y is x−y.

The Fq*-point add/dbl component represents the point addition and point doubling operations on the elliptic curve defined over Fq*. In accordance with example implementations, the hardware 644 computes Fq*-point add/dbl in Jacobian Projective coordinates.

The Fq*-point mult component represents scalar multiplication on the elliptic curve defined over Fq*. The $Fq^{12}$-exp component represents exponentiation on $Fq^{12}$. The Fq*-point mult and $Fq^{12}$-exp components may be highly side channel vulnerable and be involved to process private keys during the generation of the EP ID signature.

EXAMPLES

Illustrative examples of the technologies disclosed herein are provided below. An embodiment of the technologies may include any one or more, and any combination of, the examples described below.

Example 1 includes a method that includes generating a direct anonymous attestation (DAA)-based signature to prove an electronic device is a member of a group. Generating the signature includes determining a reciprocal of a prime modulus, and determining the reciprocal of the prime modulus includes left bit shifting a Barrett multiplier by a predetermined number of bits and multiplying a result of the left bit shifting of the Barrett multiplier with the prime modulus.

In Example 2, the subject matter of Example 1 may optionally include generating an Enhanced Privacy Identification (EPID) signature.

In Example 3, the subject matter of Examples 1-2 may optionally include determining the reciprocal of the prime modulus including performing Barrett reduction.

In Example 4, the subject matter of Examples 1-3 may optionally include the electronic device including an Internet of Things (IoT) device.

In Example 5, the subject matter of Examples 1-4 may optionally include determining the modulus including determining a set of most significant bits of the prime modulus.

In Example 6, the subject matter of Examples 1-5 may optionally include the set of most significant bits including 32 bits.

In Example 7, the subject matter of Examples 1-6 may optionally include subtracting a result of multiplying the result of the left bit shifting of the Barrett multiplier with the prime modulus from a set of most significant bits of the Barrett multiplier.

In Example 8, the subject matter of Examples 1-7 may optionally include left bit shifting a result produced by the subtraction.

In Example 9, the subject matter of Examples 1-8 may optionally include determining the reciprocal of the prime modulus further including performing a plurality of iterations. Performing each iteration includes performing the left bit shifting of the Barrett multiplier, subtracting a result of multiplying the result of the left bit shifting of the Barrett multiplier, and left bit shifting a result produced by the subtraction.

In Example 10, the subject matter of Examples 1-9 may optionally include further basing the generation of the signature on a multi-exponential product of a first number raised to a first exponent, a second number raised to a second exponent, a third number raised to a third exponent and a fourth number raised to a fourth exponent; and performing a plurality of iterations to generate the multi-exponential product, wherein each iteration of the plurality of iterations is associated with a different bit position of the plurality of bit positions and comprises using no more than two temporary variables in each iteration.

In Example 11, the subject matter of Examples 1-10 may optionally include generating the signature based on a public key and a private key.

In Example 12, an electronic device includes a network interface and a cryptoprocessor. The cryptoprocessor to generate a signature based on a private key; a public key to prove membership of an electronic device in a public group and communicate the signature using the network interface. The cryptoprocessor is to perform multiple iterations of a Barrett reduction to determine the reciprocal of a prime modulus. A given iteration of the multiple iterations includes left bit shifting a Barrett multiplier by a predetermined number of bits and multiplying a result of the left bit shifting of the Barrett multiplier with the prime modulus. The cryptoprocessor is to generate the signature based on the determined reciprocal of the prime modulus.

In Example 13, the subject matter of Example 12 may optionally include the cryptoprocessor generating the signature to authenticate an Internet of Things (IoT) device.

In Example 14, the subject matter of Examples 12-13 may optionally include the predetermined number of bits including a number of most significant bits of the Barrett multiplier which are constant among the multiple iterations.

In Example 15, the subject matter of Examples 12-14 may optionally include the cryptoprocessor using the network interface to communicate data representing the signature with a cloud-based server to register an Internet of Things (IoT) device.

In Example 16, the subject matter of Examples 12-15 may optionally include the cryptoprocessor further basing the generation of the signature on a multi-exponential product of a first number raised to a first exponent, a second number raised to a second exponent, a third number raised to a third exponent and a fourth number raised to a fourth exponent; and performing a plurality of iterations to generate the multi-exponential product, where each iteration of the plurality of iterations is associated with a different bit position of the plurality of bit positions and includes using no more than two temporary variables in each iteration.

The cryptoprocessor of Examples 12-16 may be implemented using various means.

In an example, the cryptoprocessor may include a system on a chip (SoC) incorporated in a touch-enabled device.

In another example, a system includes a display, a memory and the cryptoprocessor of one or more of the above examples.

In Example 17, a method includes performing multiple iterations of a Barrett reduction to determine the reciprocal of a prime number, where a given iteration of the multiple iterations includes left bit shifting a Barrett multiplier by a predetermined number of bits, multiplying a result of the left bit shifting of the Barrett multiplier with the prime number, subtracting a result of multiplying the result of the left bit shifting of the Barrett multiplier with the prime from a set of most significant bits of the Barrett multiplier, and left bit shifting a result of the subtraction to form an input for another iteration of the multiple iterations. The method includes generating a Direct Anonymous Attestation (DAA) signature based on the reciprocal of the prime number.

In Example 18, the subject matter of Example 17 may optionally include generating the DAA signature including generating an Enhanced Privacy Identification (EPID) signature based on the reciprocal of the prime number.

In Example 19, the subject matter of Examples 17-18 may optionally include generating the signature including generating the signature for an Internet of Things (IoT) device.

In Example 20, the subject matter of Examples 17-19 may optionally include communicating the signature to a server to provision a resource for an Internet of Things (IoT) device.

In Example 21, a machine readable storage medium stores instructions that, when executed, cause a machine to perform the method any of Examples 17, 18, 19 or 20.

In another example, a computer readable medium including data is to be used by at least one machine to fabricate at least one integrated circuit to perform the method of any of Examples 17, 18, 19 or 20.

In another example, an apparatus includes means for performing the method of any one of Examples 17, 18, 19 or 20.

In Example 22, an electronic device includes means for communicating with a network; and means for generating a signature based on a private key and a public key to prove membership of an electronic device in a public group and communicating the signature using the means for communicating. The means for generating the signature performs multiple iterations of a Barrett reduction to determine the reciprocal of a prime modulus, where a given iteration of the multiple iterations includes left bit shifting a Barrett multiplier by a predetermined number of bits and multiplying a result of the left bit shifting of the Barrett multiplier with the prime modulus. The means for generating the signature generates the signature based on the determined reciprocal of the prime modulus.

In Example 23, the subject matter of Example 22 may optionally include the predetermined number of bits including a number of most significant bits of the Barrett multiplier which are constant among the multiple iterations.

In Example 24, the subject matter of Examples 22-23 may optionally include the means for generating to use the network interface to communicate data representing the signature with a cloud-based server to register an Internet of Things (IoT) device.

In Example 25, the subject matter of Examples 22-24 may optionally include wherein the means for generating the signature further basing the generation of the signature on a multi-exponential product of a first number raised to a first exponent, a second number raised to a second exponent, a third number raised to a third exponent and a fourth number raised to a fourth exponent; and performing a plurality of iterations to generate the multi-exponential product, wherein each iteration of the plurality of iterations is associated with a different bit position of the plurality of bit positions and includes using no more than two temporary variables in each iteration.

In Example 26, a technique includes generating a direct anonymous attestation (DAA)-based signature to prove an electronic device is a member of a group, where generating the signature comprises determining a multi-exponential product of a first number raised to a first exponent, a second number raised to a second exponent, a third number raised to a third exponent and a fourth number raised to a fourth exponent; and generating the signature comprises performing a plurality of iterations, wherein each iteration is associated with a different bit position of the plurality of bit positions and comprises using no more than two temporary variables in each iteration.

In Example 27, the subject matter of Example 26 may optionally include using no more than two temporary variables in each iteration, including reusing first and second temporary variables in each iteration.

In Example 28, the subject matter of Examples 26-27 may optionally include reusing the first and second temporary variables including, in a given iteration, setting a value stored in the first temporary variable equal to a square of the value; setting a value stored in the second temporary variable equal to product of a value stored in the second temporary variable and a value stored in the first temporary variable; and selectively changing the value stored in the first temporary value based on bits of the first, second, third and fourth numbers.

In Example 29, the subject matter of Examples 26-28 may optionally include each iteration being associated with a different bit position of the plurality of bit positions and include squaring a value stored in a first temporary variable; based on bits of the first and second numbers associated with the bit position associated with the iteration, storing a value in a second temporary variable; multiplying the value stored in the first temporary variable by the value stored in the second temporary variable and storing the product in the second temporary variable; based on bits of the first and second numbers associated with the bit position associated with the iteration, storing the value stored in the second temporary variable in the first temporary variable; based on bits of the second and third numbers associated with the bit position associated with the iteration, storing a value in the second temporary variable; multiplying the value stored in the first temporary variable with the value stored in the second temporary variable and storing the product in the second temporary variable; and based on bits of the second and third numbers associated with the bit position associated with the iteration, storing the value stored in the second temporary variable in the first temporary variable. The value stored in the first temporary variable after performing the iterations represents the multi-exponential product.

In Example 30, a machine readable storage medium stores instructions that, when executed, cause a machine to perform the method any of Examples 26-29.

In another example, a computer readable medium including data is to be used by at least one machine to fabricate at least one integrated circuit to perform the method of any of Examples 26-29.

In another example, an apparatus includes means for performing the method of any one of Examples 26-29.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
   an electronic device generating a Direct Anonymous Attestation (DAA) signature;
   the electronic device performing multiple iterations of a Barrett reduction to determine the reciprocal of a prime number, wherein a given iteration of the multiple iterations comprises left bit shifting a Barrett multiplier by a predetermined number of bits, multiplying a result of the left bit shifting of the Barrett multiplier with the prime number, subtracting a result of multiplying the result of the left bit shifting of the Barrett multiplier with the prime number from a set of most significant bits of the Barrett multiplier, and left bit shifting a result of the subtraction to form an input for another iteration of the multiple iterations;

the electronic device determining the DAA signature based on the reciprocal of the prime number; and the electronic device communicating the DAA signature to a server to prove the electronic device is a member of a group.

2. The method of claim 1, wherein generating the DAA-based signature comprises generating an Enhanced Privacy Identification (EPID) signature.

3. The method of claim 1, wherein the electronic device comprises an Internet of Things (IoT) device, and the electronic device communicating the DAA signature to the server comprises the IoT device communicating with the server to provision a resource for the IoT device.

4. The method of claim 1, wherein the electronic device comprises an Internet of Things (IoT) device.

5. The method of claim 1, further comprising generating an Enhanced Privacy Identification (EPID) signature based on the reciprocal of the prime number.

6. The method of claim 1, wherein the set of most significant bits comprise 32 bits.

7. The method of claim 1, wherein the electronic device comprises an Internet of Things (IoT) device, the server comprises a cloud-based server, and the electronic device communicating the DAA signature to the server comprises the IoT device communicating the DAA signature with the cloud-based server to register the IoT device.

8. The method of claim 1, further comprising:

further basing the generation of the signature on a multi-exponential product of a first number raised to a first exponent, a second number raised to a second exponent, a third number raised to a third exponent and a fourth number raised to a fourth exponent; and wherein each iteration of the plurality of iterations is associated with a different bit position of the plurality of bit positions and comprises using no more than two temporary variables in each iteration.

9. The method of claim 1, wherein determining the DAA-based signature comprises generating the DAA-based signature based on a public key and a private key.

10. An electronic device comprising:

a network interface; and a cryptoprocessor to generate a Direct Anonymous Attestation (DAA) signature based on a private key and a public key and communicate the DAA signature using the network interface to a server to prove membership of the electronic device in a public group, wherein the cryptoprocessor to:

perform multiple iterations of a Barrett reduction to determine the reciprocal of a prime number, wherein a given iteration of the multiple iterations comprises left bit shifting a Barrett multiplier by a predetermined number of bits, multiplying a result of the left bit shifting of the Barrett multiplier with the prime number, subtracting a result of multiplying the result of the left bit shifting of the Barrett multiplier with the prime number from a set of most significant bits of the Barrett multiplier, and left bit shifting a result of the subtraction to form an input for another iteration of the multiple iterations; and determine the DAA signature based on the reciprocal of the prime number.

11. The electronic device of claim 10, wherein the cryptoprocessor to generate the signature to authenticate an Internet of Things (IoT) device.

12. The electronic device of claim 10, wherein the cryptoprocessor to generate an Enhance Privacy Identification (EPID) signature based on the reciprocal of the prime number.

13. The electronic device of claim 10, wherein the server comprises a cloud-based server, and the cryptoprocessor to use the network interface to communicate data representing the signature with the cloud-based server to register an Internet of Things (IoT) device.

14. The electronic device of claim 10, wherein the cryptoprocessor to:

further base the generation of the signature on a multi-exponential product of a first number raised to a first exponent, a second number raised to a second exponent, a third number raised to a third exponent and a fourth number raised to a fourth exponent; and wherein each iteration of the plurality of iterations is associated with a different bit position of the plurality of bit positions and comprises using no more than two temporary variables in each iteration.

15. A non-transitory storage medium to store instructions readable by a processor-based machine, wherein the instructions, when executed by a processor, cause the processor to:

generate a Direct Anonymous Attestation (DAA) signature;

perform multiple iterations of a Barrett reduction to determine the reciprocal of a prime number, wherein a given iteration of the multiple iterations comprises left bit shifting a Barrett multiplier by a predetermined number of bits, multiplying a result of the left bit shifting of the Barrett multiplier with the prime number, subtracting a result of multiplying the result of the left bit shifting of the Barrett multiplier with the prime number from a set of most significant bits of the Barrett multiplier, and left bit shifting a result of the subtraction to form an input for another iteration of the multiple iterations;

determine the DAA signature based on the reciprocal of the prime number; and communicate the DAA signature to a server to prove an electronic device is a member of a group.

16. The storage medium of claim 15, wherein the instructions, when executed by the processor, cause the processor to generate an Enhanced Privacy Identification (EPID) signature based on the reciprocal of the prime number.

17. The storage medium of claim 15, wherein the processor-based machine comprises an Internet of Things (IoT) device.

18. The storage medium of claim 15, wherein the instructions, when executed by the processor, cause the processor to communicate the signature to the server to provision a resource for an Internet of Things (IoT) device.

* * * * *